United States Patent [19]

Harman

[11] 4,306,257
[45] Dec. 15, 1981

[54] PROCESSING READ-BACK SIGNALS IN MAGNETIC DISK SYSTEMS

[75] Inventor: Jefferson H. Harman, Thousand Oaks, Calif.

[73] Assignee: Persci, Inc., Los Angeles, Calif.

[21] Appl. No.: 105,895

[22] Filed: Dec. 21, 1979

[51] Int. Cl.³ .............................................. G11B 5/45
[52] U.S. Cl. ...................................... 360/67; 360/65
[58] Field of Search ............................ 360/65, 67, 78

[56] References Cited

U.S. PATENT DOCUMENTS

| | | | |
|---|---|---|---|
| 2,901,737 | 8/1959 | Stouall, Jr. | 360/65 |
| 3,032,719 | 5/1962 | Beck | 360/67 |
| 3,430,215 | 2/1969 | Krossa et al. | 360/67 |
| 3,465,321 | 9/1969 | Reisfeld | 360/67 |
| 3,660,821 | 5/1972 | Weber et al. | 360/67 |
| 4,165,495 | 8/1979 | Takahashi | 360/65 |

*Primary Examiner*—Vincent P. Canney
*Attorney, Agent, or Firm*—Smyth, Pavitt, Siegemund & Martella

[57] ABSTRACT

The signal read-back from a magnetic disk is processed in dependance upon the track diameter in order to cut higher frequencies for outer tracks and to boost high frequencies for inner tracks for, respectively, correcting flat signal portions and eliminating or reducing peak displacement. The circuit develops a signal-amplitude-modifying factor in form of a cosine function of the frequencies of the read-back signal as applied. Two thus modified read-back signals are developed, varying oppositely in strength in dependance upon the track diameter. These two signals are combined to obtain the selective cutting or boosting as required.

6 Claims, 3 Drawing Figures

PROCESSING READ-BACK SIGNALS IN MAGNETIC DISK SYSTEMS

BACKGROUND OF THE INVENTION

The present invention relates to the recovery of magnetically recorded digital information and more particularly, the invention relates to improvements in the readout of digital information recorded on magnetic disks or diskettes.

Digital information is conventionally written or recorded on magnetic surfaces by placing on the surface a series of magnetic flux reversals. The spacing of these reversals alongside the track and/or the direction of the reversal is used as an encoding pattern. Various recording formats are known here (Manchester, Miller, triperiod, etc.). These codes and their development and evolution have in common the attempt to increase the data density (bits-per-inch rating). All codes and methods are limited by the (obvious) requirement that the reversals and their relative spacing must be recoverable. A vexing problem of long standing is the so-called peak displacement, which means that the read-back voltage produced by a transducer should have a peak when the transducer gap passes the center of the flux reversal area on the track. Consider three transitions (and read-back peaks) in sequence. If they are unequally spaced, the middle one will appear shifted towards the farther one, thus tending to "equalize" the spacing. For too closely spaced transitions, differences in spacing may become completely obliterated in that fashion. A companion problem, but so to speak on the opposite end, is posed by transitions which are spaced too far on account of too low a package density. Whenever transitions are spaced too far, flat portions occur in the read-back signal, in between the widely spaced peaks.

The entire magnetic record and read-back process can be analyzed as follows. The magnetic storage system can be represented in a model as a "black box," i.e., a quadrupole whose input is the recording voltage, whose output is the transducer read-back voltage, and whose content is the entire magnetic storage system. It was found that such a system acts like a low pass filter, and at least some of the read-back and recovery problems can be traced in that fasion. It has been proposed to use a so-called slimming filter in the recovery and playback circuit of digital magnetic tape storage. The slimming filter has also been used in the output circuit and a flying head cooperating with a hard recording surface. The read-back voltage is passed through the slimming filter which boosts the frequencies in the range of the high frequency roll-off of the above-defined low pass filter. Of critical importance here is the requirement that the filter must not introduce a frequency-dependent phase shift among the various signal components because such a phase shift produces its own distortion.

Pursuant to further development in this field, and here particularly to the problem of data recovery from recordings on a flexible disk, it was discovered that a slimming filter of the type referred to above actually interfers with the recovery of digital data whenever the transitions or flux reversals on the magnetic recording track are physically spaced fairly wide. This occurs particularly in the outer tracks of a magnetic recording disk.

DESCRIPTION OF THE INVENTION

It is an object of the present invention to improve the contour of a signal as derived from transducer reading magnetic recordings, particularly digital recordings, from the tracks on a magnetic disk.

It is another object of the present invention to improve the recovery of digital data as recorded on a magnetic disk.

It is a related object of the present invention to improve restauration of a voltage signal as was originally recorded on a magnetic disk, following retrieval of the recording.

It is a specific object of the present invention to improve so-called slimming filters provided for compensating the high-frequency roll-off effect of a magnetic recording system.

It is another object of the present invention to process read-back signals as developed by a transducer cooperating with a magnetic disk, so that peak shifts as well as flat signal portions in-between peaks are compensated to some extent.

It is another specific object of the present invention to control the frequency response in a read-back circuit which is connected to a transducer retrieving magnetically recorded data.

It is a feature of the present invention, in accordance with the last-mentioned specific object, to control such a frequency response in dependance upon the track diameter, i.e., in response to a signal representing the diameter (or radius, or distance from the axis of rotation) of the track from which data or information is being read and retrieved.

It is a feature of the present invention to cut and attenuate the frequency response of such a read-back circuit in the higher frequency range and to a degree which increases with track diameter.

It is another feature of the present invention to boost the frequency response in such a read-back circuit in the higher frequency range and to a degree which increases with a decrease in track diameter.

In accordance with the preferred embodiment of the present invention, it is suggested to provide a filter circuit for connection to a transducer reading magnetically recorded data from annular tracks on a disk; the filter operates in response to a signal which represents the track diameter and boosts higher frequency components of the reproduced signal for larger track diameters but cuts or attenuates the higher frequency components for smaller diameter tracks.

From a different point of view, the preferred embodiment of the present invention is based on a selection of a track on the disk in relation to which disk speed and data recording rate are optimized in the sense that the read-back signal requires neither a boost nor a cut in the higher frequency range. The package density is not too high to produce noticeable peak display, nor too low to produce a noticeable flat portion in the read-back voltage. For tracks having diameters larger than the particular, selected one, the frequency response is cut in the higher frequency range of the read-back signal, and the frequency response is boosted in the higher frequency range for signals as read from tracks of smaller diameter.

From a practical point of view, a filter circuit is provided which responds to a signal representing the diameter of the track being read. The filter circuit passes the read-back signal without modification, for one particular track. On the other hand, a compensating signal is derived from the filter circuit which (for uniform amplitude input) increases or decreses with frequency but in dependence upon the track diameter; the compensating signal is zero for the particular diameter. Whenever a different track is being read, the compensating signal as combined with the read-back signal boosts or cuts high-frequency components as the track diameter demands.

The filter circuit is, for example, constructed as a delay line having an input impedance equal to the characteristic impedance of the delay line to which the read-back signal is applied. The delay line input and output are applied to a circuit which responds also to a signal representing the track diameter as a modulation signal. The latter circuit develops two outputs, one boosting higher frequencies and the other one attenuating higher frequencies; the effect of the sum total depends on the track diameter signal. This combined signal is added to the transducer output signal (e.g., as developed at the delay line output), so that in toto higher frequencies are boosted or cut, depending upon the diameter of the track from which the data are read. For at least one median track, the transducer output signal is not modified.

It should be noted that one could apply the broad concept of a track-dependant HF response correction in two different ways. Suppose one applies HF cut to all read-back signals-with no or little correction for the innermost track and maximum HF cut for signals from the outermost track. In other words, no compensation is provided for any peak displacement (being the hallmark of a high packing density). This then is quite inefficient as it would require a package density sufficiently low to produce no peak displacement, even on the track with the densest package, which is the innermost track. This, indeed, wastes storage space.

Conversely, one may consider an HF boost for all read-back signals, with little or no boost for signals from the outermost track and severer boosts for smaller diameter tracks. This approach would require a high package density already on the outermost track to avoid flat portions in the read-back signal. The package densities would be still higher for smaller diameter tracks. While seemingly this appears desirable, it has to be observed that limits exist for the package density, even if the HF response is boosted so that the number of tracks on the disk is actually limited. The radial spread in diameter differences becomes small when one uses HF boosting only. It is thus apparent that optimum results will be achieved if, as per the preferred embodiment, the read-back signal from a middle track is left as is, the signals from tracks located closer to the outside are HF boosted, and the signals from tracks of smaller diameter are cut or attenuated in the higher frequency range. Strictly speaking, and mentioned here only for the purpose of completion, the diameter value associated with a zero-compensating signal may actually pertain to no track, but the corresponding circle may be located in-between two tracks.

The preferred embodiment of the invention, the objects and features of the invention and further objects, features and advantages thereof will be better understood from the following description taken in connection with the accompanying drawings.

DESCRIPTION OF THE DRAWINGS

Proceeding now to the detailed description of the drawings, FIG. 1 illustrates a portion of a disk file system and of the read-out or read-back circuit to the extent it incorporates the features of the invention. The system includes a flexible magnetic disk 1, being driven for constant speed rotation by a motor 2. The disk cooperates with a transducer or transducer assembly 3, being mounted on a carriage 4. Radial movement is imparted upon carriage 4 by means of a liner motor 5 such as a voice coil motor which is under control of a control circuit 6.

Figure 1:
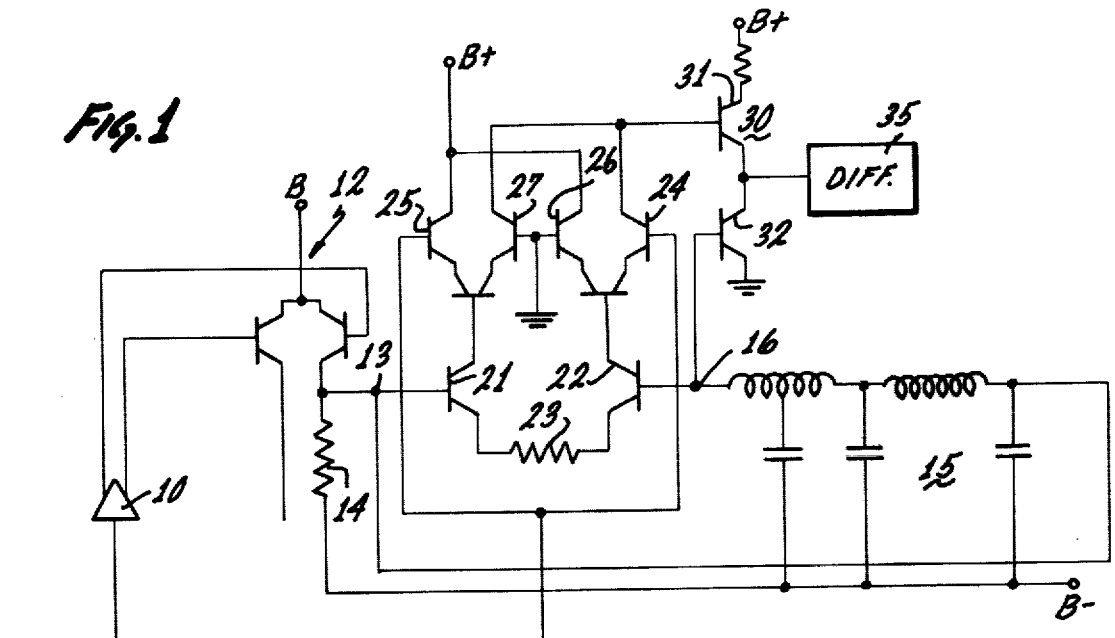
FIG. 1 is a block and circuit diagram in accordance with the preferred embodiment of the present invention.

Details of the control circuit 6 do not have to be described because the control and positioning of carriage 4 and of transducer assembly 3 is not directly a subject matter of this invention. However, control circuit 6 for motor 5 includes a speed loop, and a portion of this speed loop is used in practicing the invention.

Carriage 4 includes an optical wedge 7, e.g., a wedge-shaped, transparent area on an otherwise opaque plate (or vice versa) and extending in the direction of the carriage movement. A photo-electric detector 8 (or detector array) monitors the position of the wedge and produces an output signal whose magnitude directly represents the position of the wedge and, therefore, of a carriage.

A differentiation circuit 9 produces the first derivative (in time) of the electrical signal and, therefore, generates a signal that is proportionate to the speed of the carriage. That speed signal is used in control circuit 6 for obtaining and providing a controlled speed for the carriage motor.

Since the wedge, the carriage, and the transducers move in unison, the output signal of detector 8 is also directly indicative of the position the transducer assembly has in relation to the disk and its axis of rotation. Direct proportionality is not needed here, nor is it important whether the effective output signal increases linearly or decreases with diameter, as long as the signal and its variations can be associated with the diameter of the track above which the transducers are positioned in any instant.

This position signal is generated even then when the motor does not move and the transducer remains on the same track, e.g., for writing data thereon or reading data therefrom. This analog signal, representing the track position of the transducers, is used by and in the read-back signal processing circuit, to be described next.

Figure 3:
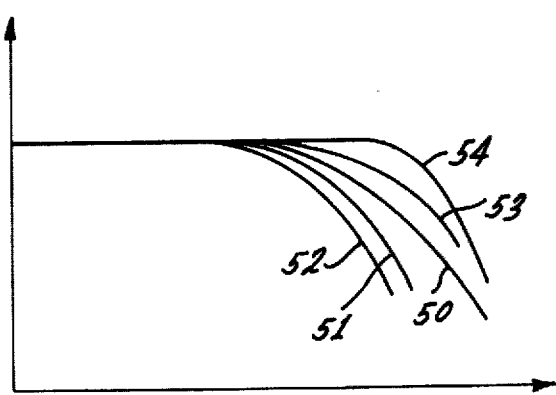
FIG. 3 is a graph, showing frequency roll-off of a magnetic recording system, and its modification for a disk system, and in accordance with the system and circuit shown in FIG. 1.

Transducer 3 is connected during a data read-back phase to a read circuit which includes a preamplifier 10 connected across the transducer output terminals and having a double-ended output. Presently, it is repeated what was said above with regard to the frequency response of the read-back signal. Curve 50 in FIG. 3 represents the frequency response of the magnetic storage system as such, drawn to a logarithmic frequency scale on the abscissa, the ordinate being shown in db. Specifically, curve 50 represents (along the ordinate) the ratio of the input voltage as applied to a record transducer for recording data, over the output voltage as applied, e.g., to read-back amplifier 10 (or 12), in dependance upon frequency. Typically, a noticeable roll-off occurs for frequencies above approximately 500 kHz.

The read signal is now processed by subjecting it to a filter action which is dependant upon the track position. The outputs of amplifier 10 are fed to the two inputs of a differential amplifier 12 having an output terminal 13 from which the read-back voltage is taken. Terminal 13 is connected to a resistor 14 whose other end is returned to common or B−, and it has a particular value to be explained shortly.

In addition, terminal 13 is connected to one end of a delay line 15, which is a series circuit of a $\pi$ network and of a T network and ends in an output terminal 16. It appears from network theory that the signals at terminals 13 and 16 are in phase, but their ratio is equal to the cosine of the product of the delay time $t_d$ provided by the delay line multiplied by the frequency ($\omega$, in rads) of the signal applied. These signals are used to modify the frequency response of the circuit to the read-back signal as follows.

The two terminals, 13 and 16, are connected to a circuit 20 which forms a compensating signal whose amplitude is (a) particularly variable with frequency (for a particular range of interest) and (b) dependant upon the track diameter.

Circuit 20 includes two transistors 21 and 22 whose emitters are resistively interconnected and whose base electrodes are connected to terminals 13 and 16, respectively. Consequently, the collector currents for the two transistors 21 and 22 are oppositely equal, being in each instance proportionate to the difference between the voltages at terminals 13 and 16, the proportionality factor being the inverse of the resistance of resistor 23.

The collector current from transistor 21 is divided between a pair of emitter-coupled transistor 25 and 27, and the collector current from transistor 22 is divided between a pair of emitter-coupled transistors 24 and 26. In each pair, one transistor has its base electrode biased to a constant value (e.g., ground); these are the transistors 26 and 27. The two other transistors (24 and 25) receive the track-defining analog signal from impedance and signal level matching amplifier 17.

The two transistors 25 and 26 have their collectors directly connected to B+. The collector electrodes of transistors 24 and 27 are tied together to feed a common signal to a transistor 31 of a summing point 30. The two transistors 24 and 27 could actually be considered a part of that summing point.

A transistor 32 introduces another component to summing point 30, in that the base of transistor 32 is connected to terminal 16 and, thus, adds the delayed read-back signal to the compensating signal developed on transistor 31. The output of summing point 30 is, for example, connected to a differentiating circuit 35 for further signal processing, such as peak detection, etc.

In operation of the circuit will be explained next. In view of the fact that resistor 14 equals the characteristic impedance of delay line 15, the voltage at terminal 16 equals the input voltage as applied across differential amplifier 12, but has a phaseshift porportionate to its frequency, so that the signal at terminal 16 is delayed as a whole, whithout relative phaseshift of its components. On the other hand, the signal at terminal 13 is, as stated, equal to the signal at terminal 16, multiplied by the cosine of the product of the delay line length (in time, $t_d$) and frequency $\omega$ in rads; $V_{13}=V_{16}\cdot\cos(\omega t_d)$. The equipment variable in this relation is the length of the delay line; one can choose the effective range for this cosine factor, so that $\cos \omega t_d = -1$ occurs in the roll-off range of the above-defined characteristic (50). Due to the emitter coupling of the two transistors 21 and 22, the collector current of 21 is proportionate to $-(V_{13}-V_{16})=V_{16}(1-\cos \omega t_d)$, and the collector current of transistor 22 is proportionate to $V_{16}(\cos \omega t_d - 1)$.

It may now be assumed that the track number voltage (output of amplifier 17) is precisely equal to the bias applied to transistors 26 and 27, then both collector currents from transistors 21 and 22 are equally divided, the outputs of transistors 24 and 27 are oppositely equal, so that the summed signal at transistor 31 is zero. Hence, the output of summing point 30 is determined only by signal $V_{16}$. The read-back signal is not modified. The straight line, 40, in FIG. 2 depicts this situation.

Assuming now that the signal from circuit 8-17 is more positive, corresponding to a large track diameter, one can see that the current flow is shifted from transistor 27 to transistor 25 and from transistor 26 to transistor 24. Thus, the component previously furnished by transistor 27 ($=V_{16}(1-\cos \omega t_d)$) to summing point 30 is now diminished, and the component previously furnished by transistor 24 to the summing point ($=V_{16}(\cos \omega t_d - 1)$) is now increased in magnitude. The former is positive, the latter is actually negative in the frequency range of interest. The resulting compensating signal voltage, as applied to the summing point by means of transistor 31, is equal to $\alpha V_{16}(1-\cos \omega t_d)$, wherein $\alpha$ is negative and reflects the imbalance generated in transistors 24 to 27 by operation of the track-dependant control voltage $V_{17}$.

Figure 2:
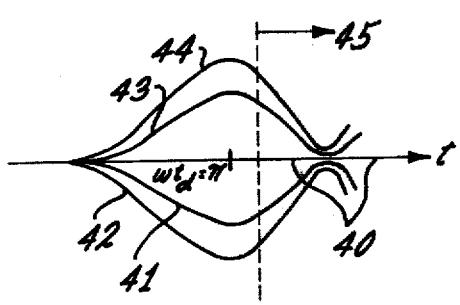
FIG. 2 is a graph, showing the frequency response of a circuit shown in FIG. 1.

The compensating voltage now produced is plotted by way of example as trace 41 in FIG. 2. The portion of the trace (and of the others in the figure) more to the right of the amplitude extremity ($\omega t_d = \pi$), including the periodically recurring pattern on account of the cosine function and for the frequencies of $\omega t_d = 2\pi, 3\pi$, etc., is not of interest, since these frequencies do not occur in the read-back signal.

The compensating signal voltage, being proportionate to but smaller than $V_{16}$, trace 41, is used to correct the frequency response of the magnetic recording/reproduce system, for a larger diameter track. It is, therefore, subtracted from $V_{16}$ as directly applied to summing point 30. The particular voltage, however, is directly related to frequency if one selects the values, so that $\omega t_d = \pi$ and is well in the higher frequency roll-off range of the magnetic recording system, so that, indeed, the term $1-\cos t_d\omega$ increases with frequency for lower frequencies.

Curve 51 in FIG. 3 represents corrected and compensated frequency response of the system for read-back signals from a track having a diameter larger than the median diameter. Curve 52 is the corrected response for read-back signals from a track having still larger diameter (e.g., the outermost track). Accordingly, the higher frequencies are attenuated for indirectly boosting lower frequency components so that flat signal portions are avoided.

It can readily be seen that a disposition of transducer 3 more on the radial inside from the median track results in a control signal from circuit 8-17 which unbalances the transistors 24 and 27 differently in that a larger current flow is now shifted to transistors 24 and 27.

Accordingly, a positive nonzero signal component is generated in summing point transistor 31 which is positive-proportional to $V_{16}$ and dependant upon frequency by the same factor $1-\cos \omega t_d$. Trace 43 in FIG. 2 represents the response of circuit 20 to signals of varying frequency, the signals having been read from a small diameter track.

The frequency response of the system is, therefore, corrected for signals read back from a smaller diameter track as per trace 53 in FIG. 3. Curve 54 represents the corrected response for signals read from a still smaller diameter track, e.g., the innermost track. Higher frequency components are boosted with maximum boost for the innermost track, to offset peak displacement, being more noticeable otherwise, the smaller the track diameter.

It can thus be seen that summing point 30 provides an output signal whose higher frequency roll-off is track-dependantly modified. For a central track, the signal is, in fact, the unmodified read-out signal because the two components added via the output lines of transistors 24 and 27 cancel each other. For a larger track radius, the attenuating component prevails, resulting in a characteristic such as 51; and a still more pronounced cut occurs, the farther out a track is located. Conversely, for more inwardly located tracks, high frequency roll-off of the recording system is partially compensated by effectively extending the flat response curve to higher frequencies.

The selection of the "median" track, in which there is neither a boost nor a cut (response 50), is arbitrarily selective as far as the system is concerned, by appropriately selecting the bias level for transistors 26 and 27. If desired, one may even shift the level to correspond to the innermost track or to the outermost track to obtain only attenuation or only boosting, or one may provide for boosting (cutting) to be effective on a smaller or larger number of tracks as the case may be. The bias selection is thus amenable to a rather fine turning process in the frequency response of the read-back circuit.

The invention is not limited to the embodiments described above, but all changes and modifications thereof not constituting departures from the spirit and scope of the invention are intended to be included.

I claim:

1. In a read, reproduce, and recovery circuit connected to a transducer which cooperates with a rotating disk for reading magnetic recordings from different tracks on the disk, the tracks differing in diameter, the combination comprising:
   the first circuit means for providing a control signal representing the diameter of a track of the tracks and being read;
   second circuit means connected to the transducer and providing a read-back signal;
   a delay line connected to the second circuit means to develop two different signals of similar phase and having a ratio which is propornal to a function that increases with frequency in a particular range, one of the signals being said read-back signal, the other one being a delay line output signal; and
   third circuit means connected to the first circuit means and to said delay line for combining the read-back signal and the delay line output signal with said control signal for track diameter dependently modifying the read-back signal by increasing a frequency response thereof, increasing to occur with increasing frequency and track diameter.

2. The combination as in claim 1, wherein at least for some of the track diameters, the modification is effective as a boost in frequency response for relatively high frequencies of the read-back signal, the boost being the stronger the smaller the track diameter.

3. The combination as in claim 1, wherein at least for some of the track diameters the modification is effective as a cut in frequency response for relatively high frequencies of the read-back signal, the cut being the more pronounced the larger the track diameter.

4. The combination as in claim 1, wherein for particular ones of the tracks the modification is a cut in frequency response, being the more pronounced the larger the diameter, and for others of the tracks, the modification is a boost in frequency response, being the stronger, the smaller the diameter.

5. The combination as in claim 1 or 4, wherein the third circuit means generates first and second correction signals each of which increases with frequency for a particular range of frequencies and which increase or decrease also with increasing or decreasing track diameter as signalled by the first circuit means, and means included in the third circuit means to combine the first and second correction signals to obtain the correcting signal as combined by the fourth circuit means.

6. In a read and reproduce circuit connected to a transducer which cooperates with a rotating disk for reading magnetic recordings from different tracks on the disk, the combination comprising:
   first circuit means for providing a signal representing the diameter of a track being read; and
   second circuit means connected to the first circuit means and to the transducer and operating in response to the signal for boosting the high frequency response to read signals from the transducer read from tracks of smaller diameter and for cutting the high frequency response to such read signals read from tracks of larger diameter, the response not being changed, or only insignificantly, for at least one track of median diameter, said second circuit means including a delay line connected to develop two different signals of similar phase, and the ratio of which is proportional to a function that increases with frequency in a particular range;
   circuit means connected to the delay line to generate first and second correcting signals which increase in magnitude in the particular range, the increase being further dependent upon said track diameter signal as provided by the first circuit means; and
   summing circuit means connected for subtracting the first and second correcting signals from each other and combining them with a read-back signal from the transducer.

* * * * *